United States Patent [19]
Nishida et al.

[11] 3,853,577
[45] Dec. 10, 1974

[54] METHOD FOR PREPARING DECORATIVE LAYER

[75] Inventors: Hiroshi Nishida, Kashiba-machi; Satoshi Tanaka, Nishinomiya; Akiyoshi Hatanaka, Ibaragi; Akira Yoneyama, Amagasaki; Masafumi Yamanishi, Takarazuka, all of Japan

[73] Assignees: The Bonntile Co., Ltd., Tokyo; Dai Nippon Toryo Co., Ltd., Osaka-shi, Osaka-fu, both of, Japan; part interest to each

[22] Filed: Jan. 5, 1973

[21] Appl. No.: 321,340

[30] Foreign Application Priority Data
Jan. 13, 1972    Japan.................. 47-6051

[52] U.S. Cl............. 117/8, 52/309, 106/90, 106/97, 117/37 R, 117/65.2, 117/72, 260/37 EP
[51] Int. Cl. ............ B44c 1/20, E04c 1/00
[58] Field of Search............... 117/8, 65.2, 72, 37 R; 260/37 EP; 52/309; 106/90, 97

[56]                References Cited
UNITED STATES PATENTS

| | | | |
|---|---|---|---|
| 1,581,795 | 4/1926 | Delaney | 117/8 |
| 3,155,529 | 11/1964 | Paturzo | 117/72 |
| 3,198,758 | 8/1965 | Donnelly | 260/37 EP |
| 3,209,500 | 10/1965 | Bernett | 260/37 EP |
| 3,310,511 | 3/1967 | Reinert | 260/37 EP |
| 3,391,013 | 7/1968 | Videen | 117/8 |
| 3,616,103 | 10/1971 | Greiner et al. | 117/8 |
| 3,677,995 | 7/1972 | Earing | 260/37 EP |
| 3,753,849 | 8/1973 | Duff | 260/37 EP |
| 3,775,212 | 11/1973 | Iwasaki et al. | 117/8 |
| 3,778,290 | 12/1973 | Shearing | 117/8 |

*Primary Examiner*—Michael Sofocleous
*Attorney, Agent, or Firm*—Oblon, Fisher, Spivak, McClelland & Maier

[57]                ABSTRACT

A method of preparing a decorative layer which comprises spray-coating a mortar composition containing 3 – 50 wt% of an epoxy resin and an epoxy hardener, 5 – 70 wt% cement, 5 – 70 wt% of an aggregate powder and 5 – 30 wt% water onto the surface of a base so as to form a concavo-convex surface pattern, pressing the top of the convex portions of the surface while in a semihardened condition to form flat areas on the tops of the convex portions and finish-coating the surface with a synthetic resin enamel or lacquer.

7 Claims, 3 Drawing Figures

METHOD FOR PREPARING DECORATIVE LAYER

BACKGROUND OF THE INVENTION

1. Field of the Invention:

This invention relates to a method for preparing a decorative layer having a tile-like appearance on inner or outer walls, or a ceiling of a building.

2. Description of the Prior Art:

It has been known to apply a cement mortar or an organic mortar such as vinylacetate resin, acrylic ester resin and the like by air blasting or spraying the material onto an inner or outer wall of a building which is fabricated from concrete, mortar, plate, foamed concrete or metal plate. These mortars have been widely and practically used for coating walls in order to improve the water-proofing properties, and durability while imparting beautiful patterns. However, the conventional decorative layers have the following disadvantages. For example, when the decorative layer is prepared by using a cement mortar, a base surface of a synthetic resin must be disadvantageously applied in order to improve the adhesion of the mortar to the base. Also, cracks may form on the hardened surfaces. If the decorated layer hardens during summer or under dry conditions, it is necessary to apply an under-treatment to the surface such as sprinkling moisture in in order to prevent vaporization of moisture from the surface, or to form a moisture vaporization preventing layer.

When the decorative layer is prepared with an organic mortar, it has been found that disadvantages result from the delay in the formation of hard layers when the layers are hardened in high humidity. Also, difficulties are encountered during the press operation in forming concavo-convex patterns after coating the organic mortar.

A need therefore, exists for a method of applying a decorative layer which overcomes the disadvantages of the prior art processes, and which provides a decorative layer which is easily applied.

SUMMARY OF THE INVENTION

It is an object of this invention to provide a method for preparing a decorative layer having a special surface appearance different from conventional patterns and having none of the disadvantages of low durability, low adhesion to the base and complicated application procedures.

Briefly, this object and other objects of this invention as hereinafter will become apparent, can be attained by a method for preparing a decorative layer which comprises preparing a mortar composition having 3 – 50 wt% of an epoxy resin and an epoxy hardener, 5 – 70 wt% of cement, 5 – 70 wt% of an aggregate, 5 – 30 wt% water and if necessary 0 – 20 wt% of the other additives such as coloring materials, spraying (air-blasting) the mortar composition on a base surface, pressing convex portions while in a semi-hardened condition to form flat convex portions and then applying a finishing coat of a synthetic resin enamel or lacquer on the surface.

BRIEF DESCRIPTION OF THE DRAWING

The drawings illustrate embodiments of this invention.

DETAILED DESCRIPTION OF PREFERRED EMBODIMENTS

Figure 1:
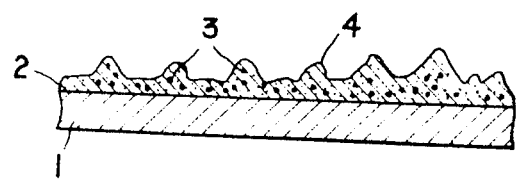
FIG. 1 is a sectional view of a decorative layer spray-coated with a composition.

In the method of this invention, the epoxy resin is usually used in the form of an epoxy emulsion, which is an o/w type emulsion preferably containing 40 – 60 wt% of the epoxy resin from the view-point of emulsion stability. The epoxy resin is preferably a liquid epoxy resin prepared by using bisphenol-A and epichlorohydrin as the base, and it is uniformly emulsified with an emulsifier which is usually a nonionic surfactant or another type of emulsifier.

Suitable epoxy resins used in this invention include epoxy resins containing at least two terminal epoxy groups, which are liquid at room temperature such as a bisphenol A-epichlorohydrin type, a side-chain type, an alicyclic type, a polymerized aliphatic ester type, a novolak type, a butyl glycidyl ether type, a polyalkalene type, a glyceryl triepoxide type, and an alkylphenol type epoxy resin. Suitable liquid epoxy resins having at least two terminal epoxy groups include epoxidized glycerin dialiphatic esters, 1,4-bis(2,3-epoxy-propoxy) benzene, 1,3-bis(2,3-epoxy-propoxy) benzene, 4,4'-bis(2,3-epoxy-propoxy) diphenylether, 1,8-bis(2,3-epoxy-propoxy) octane, 1,4-bis(2,3-epoxy-propoxy) cyclohexane, 4,4-bis(2-hydroxy-3,4'-epoxy-butoxy) diphenyldimethyl methane, 1,3-bis(4,5-epoxy-pentoxy) 5-chlorobenzene, 1,4-bis(3,4-epoxy-butoxy)-2-chlorocyclohexane, 1,3-bis(2-hydroxy-3,4-epoxy-butoxybenzene and 1,4-bis(2-hydroxy-4,5-epoxy-pentoxy) benzene. It is especially preferable to use an epoxy polyether of a polyhydric phenol. It is possible to use a mixture containing more than 70% by weight of a liquid epoxy resin and less than 30% by weight of a solid epoxy resin which can be soluble in the liquid epoxy resin.

The epoxy resin is usually emulsified with a surfactant to form an o/w type emulsion. Suitable surfactants include anionic surfactants such as soap, alkyl sulfates, alkyl sulfonates, alkylaryl sulfonates, and sulfosuccinates and nonionic surfactants such as polyoxyethylene ethers, polyoxyethylene esters, sorbitan esters and monglyceride nonionic surfactants. When an epoxy resin emulsion is admixed with the cement, the epoxy hardner, an aggregate and the composition is frozen and then melted. The epoxy resin can still have film formability. The epoxy resin emulsion can be prepared by emulsifying a liquid polyepoxy resin containing at least two epoxy groups or a mixture of the liquid epoxy resin and the soluble solid epoxy with water and a surfactant. Suitable epoxy hardeners include conventional hardeners used in conventional epoxy emulsions such as polyamines, amine adducts, polyamides, and the like. It is especially preferable to use polyamides as the epoxy hardener having the formula

wherein *n* represents an integer and R represents a lower alkyl group. The polyamide can be prepared by the condensation of a polycarboxylic acid and a diamine. When the polyamide is used as the epoxy hardener, flexibility, adhesiveness and chemical resistance of the product are improved compared with the product containing an amine as the epoxy hardener. The epoxy resin can be uniformly mixed with a cement, an aggregate powder, a coloring agent and other additives by adding the epoxy resin as an emulsion.

It is disadvantageous to use the epoxy resin solution prepared by dissolving the epoxy resin in a solvent, because the epoxy resin solution cannot be uniformly mixed with the cement and the aggregates. In addition, the operation time is too short and the adhesion is too small because of the moisture in the composition, and there is the possibility of a fire accident and solvent toxicity because of the organic solvent. The epoxy resins impart higher adhesivity, alkali-resistance, chemical-resistance, water-resistance, weatherbility and lower contraction in comparison with vinylacetate resins, acrylic ester resins and the like. Thus, the epoxy resin is optimumly used as the resin for a decorative layer on an outer wall.

The cement used in the method of this invention is preferably an hydraulic cement such as white cement, Portland cement, alumina cement, or mixtures thereof. The aggregate powder can be a silica sand, volcanic ash, diatomaceous earth, sludge and the like. The aggregate powder is usually a fine powder having a mesh size less than 30 so as to provide suitable viscosity of the mortar compostion, a sufficient spray ability through the nozzles of applicators, and the ability to be pressed by a roller or a trowel. It is preferable to use an aggregate powder consisting of more than about 60 wt% of a 50 - 200 mesh fine powder from the viewpoint of the density and the strength of the decorative layer. In the mortar composition, if desirable, other additives such as pigment powders which impart the desired colors and a hardening accelerator such as calcium chloride, can be added.

The reason why the amount of the cement is limited to 5 - 70 wt% is as follows. If the cement content is less than 5 wt%, the adhesion of the composition deteriorates at lower temperatures, and if the composition is pressed with a roller or a trowel, the mortar composition adheres to the roller of the trowel so that it is difficult to obtain a uniform pattern. If the amount of the cement is higher than 70 wt%, the resin content relatively decreases, resulting in a decreased adhesion. Because of these reasons, the optimum amount of cement is in the range of 5 - 70 wt%, and the results of this invention can be achieved when the cement is in the indicated range.

The reason why the amount of the epoxy resin and the epoxy hardener is limited to 3 - 50 wt% is as follows. If it is less than 3 wt%, the adhesion is inferior and the bendability decreases. On the other hand, if it is higher than 50 wt%, the resin content is increased which improves the adhesion. However, under these conditions it is difficult to press the composition with a roller or trowel press because of its high tackiness. Also the cost of the composition is increased because of the high epoxy resin content.

In the epoxy resin emulsion, usually 1 : 0.5 - 1.5, preferably 1 : 0.7 - 1.2, of the epoxy resin is mixed with the epoxy hardener. If necessary, 0 - 20 wt% of other additives such as a pigment, a tackifier, a preservative, or an emulsifier can be admixed with 5 - 30 wt%, preferably 15 - 25 wt%, of water and is well kneaded to prepare the mortar composition having a suitable vixcosity for spray coating, i.e. 100 - 500 poise at 25° C. It is preferable to prepare the cement and the epoxy hardener separately from the paste of the epoxy resin emulsion and the aggregate powder.

The indicated viscosity range is suitable for wetting the surface of the aggregate powder, imparting high adhesion to the surface of the base and forming a convex surface by spraying. If the viscosity is too low, the fluidity is too high, so that a convex surface of the coating is not formed. On the other hand, if the viscosity is too high, the adhesion is too low, thus, the number of convex portions of the mortar composition which falls with the spray coating is increased. It is especially suitable to maintain the mortar composition within the following range; white cement 25 - 55 wt%, aggregate 15 - 30 wt%, water 2.6 - 18 wt%, epoxy resin 4 - 12 wt% and epoxy hardener 2 - 18 wt%.

The mortar composition can be spray-coated with a spray-gun onto the surface of a base. Optimumly, the mortar composition is spray-coated with a gun having a diameter of 4 - 12 mm at an air pressure of 2 - 8 kg/cm$^2$ so as to form a suitable concave or convex surface. The sprayed mortar composition is applied to the surface of the base is granule form so as to form a decorative surface having a concave and convex pattern whose sectional view is shown in FIG. 1. In a first coating step, it is especially preferable to under-coat the mortar composition on the surface of the base by spraying under a pressure of 4 - 8 kg/cm$^2$, and then in a second coating step, rough particles of the mortar composition are coated so as to form a concavo-convex surface by spraying under a pressure of 2 - 5 kg/cm$^2$.

Figure 2:
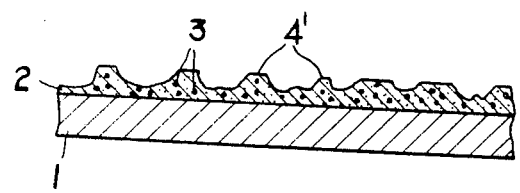
FIG. 2 is a sectional view of the decorative layer having flat areas at the top of convex portions prepared under pressure with a roller or trowel.

In FIG. 1, the reference numberal 1 designates the surface of a base, 2 designates a coated decorative layer, 3 designates an aggregate powder in the decorative layer and 4 designates convex portions of the decorative layer. After curing and semi-hardening for about 0.5 - 6 hours, in order to obtain the characteristic surface pattern of this invention, the convex portions of the decorative layer are pressed with a roller or a trowel to render flat the top portions of the peaks of convex portions, 4' as shown in FIG. 2. The pressing operation by the roller or the trowel is performed during the time the decorative layer of the mortar composition has not finally hardened and has a degree of plasticity. In order to form flat areas at the top of the convex portions, a roller or a trowel having a flat surface is employed. It is preferable to perform the pressing operation by a roller or a trowel, prior to the finishing coating in order to obtain an excellent decorative layer.

Figure 3:
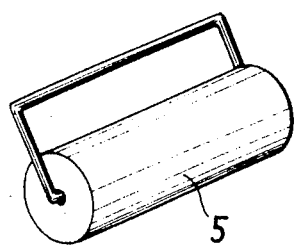
FIG. 3 is schematic view of a roller used for pressing the decorative layer.

The pressing operation can be performed by other similar methods which do not use a roller or a trowel. For example, it is possible to employ the roller 5 shown in FIG. 3. The decorative layer pressed by the roller or the trowel or the like, is further cured and hardened. After hardening, if necessary, the surface is treated, and a synthetic resin enamel or lacquer is coated at least once on the decorative layer. The synthetic resin enamel is preferably a vinyl resin paint, an acryl resin paint, an acryl-urethane resin paint, or the like. However, other synthetic resin enamels or lacquers can be used. The luster as well as the mechanical and chemical durability of the decorative layer can be improved by the finishing coating.

In accordance with the method of the invention, the epoxy resin emulsion forms the components of the decorative layer, in which the diffusion velocity of water in the emulsion is delayed in order to slow down the evaporation of moisture from the decorative layer, and to prevent the formation of cracks in the decorative layer by maintaining a desirable moisture for curing the cement. Moreover, a water spray operation or a middle treatment step at a low temperature can be eliminated because dehydration during the curing step can be minimized. In the reaction of the epoxy resin emulsion with the epoxy hardener, if water is present, hardening of the emulsion is not completed. As a consequence, the cross-linking rate is greatly decreased as well as the adhesive strenth.

In the mortar composition of the invention, the cement is incorporated together with the epoxy resin emulsion. The excess water present in the epoxy resin emulsion is used as the moisture which is required to cure the cement, so that hardening of the epoxy resin can be completed, and the hardening velocity, the hardness and the adhesive strength at low temperature will increase in comparison to the decorative layer prepared by using only the epoxy resin emulsion. When the epoxy resin emulsion is applied to a base, even though the surface of the base is a water adsorbing concrete, especially a foam concrete, the fine particles of the epoxy resin emulsion permeate into the surface of the base to form a thin layer slightly below the surface of the base. This thin layer prevents further water permeation into the deeper areas of the base. If the base is a metal, the metal surface may be treated with a corrosion inhibitor primer.

The decorative layer prepared by using a conventional organic mortar is very tacky under semi-hardened conditions, thus rendering pressing operations by rollers or trowels difficult. However, in accordance with the process of this invention for admixing the cement, tackiness of the cement can be decreased and the plasticity of the decorative layer is suitable for working for a period of 0.5 – 6 hours after it is applied. The convex portions of the decorative layer can be pressed or flattened without adhesion of these portions of the decorative layer to the pressing tool.

Having generally described the invention, a further understanding can be obtained by reference to certain specific examples which are provided herein for purposes of illustration only and are not intended to be limiting unless otherwise specified.

EXAMPLE 1

The mortar composition shown below was thoroughly kneaded to reach a viscosity of 350 poise at 25° C. and then was spray-coated through a mortar gun having a nozzle diameter of 8 mm at a pressure of 5 kg/cm$^2$ onto a concrete surface to form a concavo-convex decorative layer.

| | |
|---|---|
| White cement | 40 wt% |
| Aggregate (average 150 mesh) | 22 wt% |
| Water | 15 wt% |
| Pigment (TiO$_2$) | 3 wt% |
| Tackifier (methylcellulose) | 2 wt% |
| Epoxy resin (liquid epoxy resin having 2 terminal epoxy groups containing a nonionic surfactant) | 6 wt% |
| Epoxy hardener (diamine-dicarboxylic acid type polyamide) | 6 wt% |

After spray-coating the mortar composition, the decorative layer was cured at 20° C. at a relative humidity of 70% for hour. The convex portions of the decorative layer were pressed with a roller having a smooth surface made of aluminum (shown in FIG. 3) while the layer was in a semi-hardened state to render the top portions of the layer flat. The layer was then hardened by a curing treatment for 16 hours.

An acryl-urethane resin enamel was coated onto the cured decorative layer 3 times as a finishing treatment. The resulting decorative layer had flat tops on the convex portions of the surface in a form similar to a die-cast pattern as shown in FIG. 2. A special surface appearance having a high gloss difference, is imparted by the gloss of the flat area of the convex portions and the gloss of the concave portions. In the pressing operation by the roller, the mortar composition did not adhere to the roller to provide uniform pressing over the surface of the layer. In the following table, the test results of the characteristics of the decorative layer of this invention are shown as well as the characteristics of conventional cement decorative layers, solvent epoxy resin decorative layers and thermoplastic resin decorative layers.

| | | Characteristics Test | Subject Invention | Cement Decorative Layer | Solvent Epoxy Resin Layer | Thermoplastic Resin Layer |
|---|---|---|---|---|---|---|
| Adhesive Strength | 1) | 5°C 80%RH 7 days | 10–15 kg/cm$^2$ | 5–10 kg/cm$^2$ | less than 5 kg/cm$^2$ | less than 5 kg/cm$^2$ |
| | 2) | weather meter 500 hours | 17–19 do. | 7–10 kg/cm$^2$ | peel from base | 7–10 kg/cm$^2$ |
| Gloss of Decorative Layer | 1) | convex | 50–80 % | less than 20 | less than 20 | less than 20 |
| | 2) | concave | 2 – 6 % | less than 20 | less than 20 | less than 20 |
| | 3) | convex-concave difference | 48–78 % | 0 | 0 | 0 |
| | 1) | room temp. | 54–61 | 50–60 | 45–70 | less than 10 |

-Continued

| Character-<br>istics Test | | Subject<br>Invention | Cement<br>Decorative<br>Layer | Solvent<br>Epoxy<br>Resin<br>Layer | Thermo-<br>plastic<br>Resin<br>Layer |
|---|---|---|---|---|---|
| Hardness | | | | | |
| 2) | 5°C<br>80%RH | 46–51 | 40–50 | 5–46 | 2 – 7 |
| | after coating<br>the fluid<br>composition<br>after | | | | |
| | 1 hour | none | none | adhesive | adhesive |
| Roller | | | | | |
| | 2 hours | none | none | adhesive | adhesive |
| Adhesive | | | | | |
| | 3 hours | none | none | slightly<br>adhesive | slightly<br>adhesive |
| Test | | | | | |
| | 4 hours | none | none | adhesive | adhesive |

The sample of this invention shown in the table above was prepared by the method of Example 1. The cement sample decorative layer was prepared by spray-coating an aqueous emulsion containing 25% of a vinylacetate resin on a concrete wall. The cement was dried, for 1 hour, and then a fluid composition prepared by kneading a mixture of 23.5 wt% of white Portland cement, 46.9 wt% of silica sand, 1.2 wt% of a red pigment, 0.2 wt% of a hardeneing accelerant consisting mainly of calcium chloride, and 28.2 wt% water, was spray-coated by a mortar gun. An alcohol solution consisting of about 50% acrylic ester was spray-coated 40 minutes after the fluid composition was applied, and then cured by letting it set for 24 hours. The surface was then coated with a thinner of an acrylic ester to finish it, and then it was allowed to set for 1 week.

The solvent epoxy resin layer was prepared by spray-coating a fluid containing 20 wt% epoxy varnish, 5 wt% of a coloring pigment, 40 wt% of a aggregate powder, 15 wt% of asbestos powder and 20 wt% of an epoxy hardener with a mortar gun on a surface, and then allowed to set for 1 week. The thermoplastic resin layer was prepared by spray-coating a fluid composition containing 25 wt% of an acryl resin emulsion varnish, 55 wt% of an aggregate powder, 5 wt% of a pigment, 5 wt% of a tackifier and other additives, and 5 wt% water, with a mortar gun on a surface and then allowed to set for 1 week.

In the characteristics tests, the adhesive strength was measured by an Olsen tensile testing machine in which the sample was maintained at 5° C. at 80% relative humidity for 7 days and then maintained in a weather meter for 500 hours. Hardness was measured by the Bar col hardness tester, wherein a sample was maintained at room temperature, and then in an atmosphere of 80% relative humidity at 5° C. Gloss of the decorative layer was measured by the JIS (Japanse Industrial Standard) K 5400-6-7 method, at a 60° miller luster degree measurement. Gloss of the convex portions and the concave portions of each sample was measured 5 times each at an incidence angle of 60° and a receiving angle of 60° by an electrophotometer. The results were calculated as percentage values (referring to the maximum and minimum values of the 5 measurements), when the gloss of the standard miller surface is 100. The difference in the gloss between the convex portion and the concave portion is shown in the table as the convex-concave difference. The adhesive test was performed by coating a fluid composition of each sample and then pressing the composition by rolling it with a tubular aluminum roller having a smooth surface (5 cm diameter) which was washed after 1, 2, 3 and 4 hours, and observing the adhesive condition of the fluid composition on the roller.

In accordance with the process of this invention, it is possible to provide a decorative layer having a high adhesive strength without requiring under-coating, and which does not develop cracks by the sudden hardening of the layer. In addition, a water spray on an intermediate treatment is not required in order to prevent dehydration in summer or at low temperatures. Thus it is possible to provide a decorative layer having a beautiful pattern, a high water-resistance, an alkali-resistance, and a high adhesive strength while imparting a suitable hardness and a high adhesive strength. Accordingly, these decorative layers are advantageous in industrial applications.

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. A method of preparing a decorative layer, which comprises:
   spray-coating a first coating under a pressure of 5 – 8 kg/cm² of a mortar composition containing 3 – 50 weight percent of an epoxy resin and an epoxy hardener, 5 – 70 weight percent cement, 5 – 70 weight percent of an aggregate powder and 5 – 30 weight percent water and having a viscosity in the range of 100 – 500 poise at 25°C onto the surface of a base;
   spray coating a second coating of said mortar composition under a pressure of 2 – 5 kg/cm² so as to form a concavo-convex surface pattern;
   pressing the top of the convex portions of the surface while in a semi-hardened condition which occurs from 0.5 – 6 hours after the application of said second coating, to form flat areas on the tops of the convex portions; and
   finish-coating the surface with a synthetic resin, enamel or lacquer.

2. The method according to claim 1, wherein an epoxy resin emulsion containing 40 – 60 wt% of said epoxy resin is used and a ratio ranging from 1 : 0.5 – 1.5 of the epoxy resin to the epoxy hardener is used.

3. The method according to claim 1, wherein said epoxy resin is a liquid epoxy resin and said epoxy hardener is a polyamide.

4. The method according to claim 1, wherein said cement is a hydraulic cement such as a white cement, Portland cement, alumina cement or mixtures thereof and said aggregate powder is characterized by a partial size less than 30 mesh.

5. The method according to claim 2, wherein said epoxy resin emulsion is prepared by separately emulsifying an epoxy resin or a mixture of an epoxy resin with another resin which epoxy resin emulsion is admixed with an epoxy hardener, a cement, and an aggregate powder when said mortar composition is prepared.

6. The method according to claim 1, wherein said epoxy resin is a liquid epoxy resin or a mixture of a liquid resin and a solid epoxy resin which is soluble in said liquid epoxy resin.

7. The method according to claim 6, wherein said liquid epoxy resin has at least two terminal epoxy groups.

* * * * *